Nov. 15, 1927. 1,649,576
E. B. CRAWFORD
VENTILATING HOOD FOR OVEN STRUCTURES
Filed Jan. 19, 1927 2 Sheets-Sheet 1
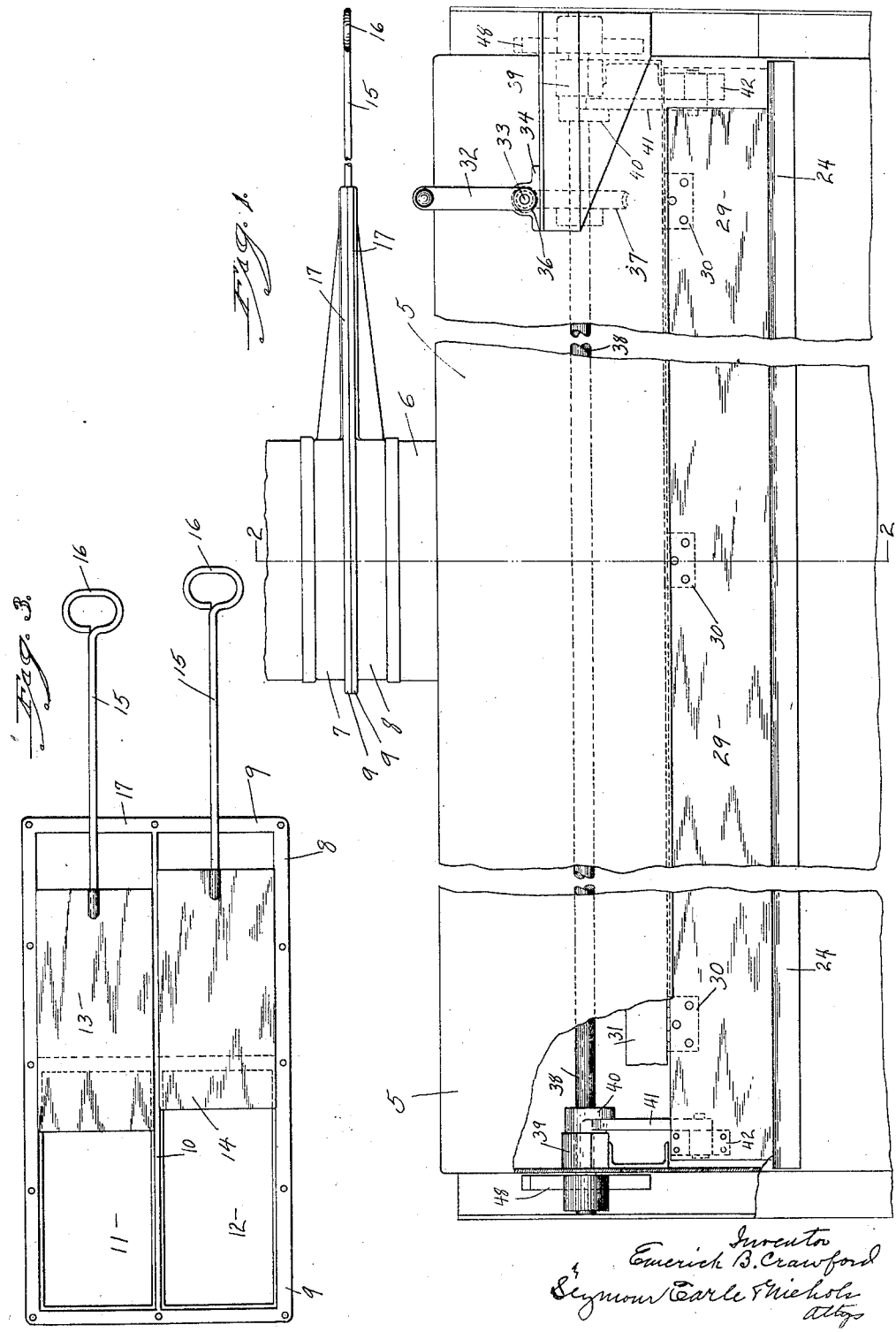

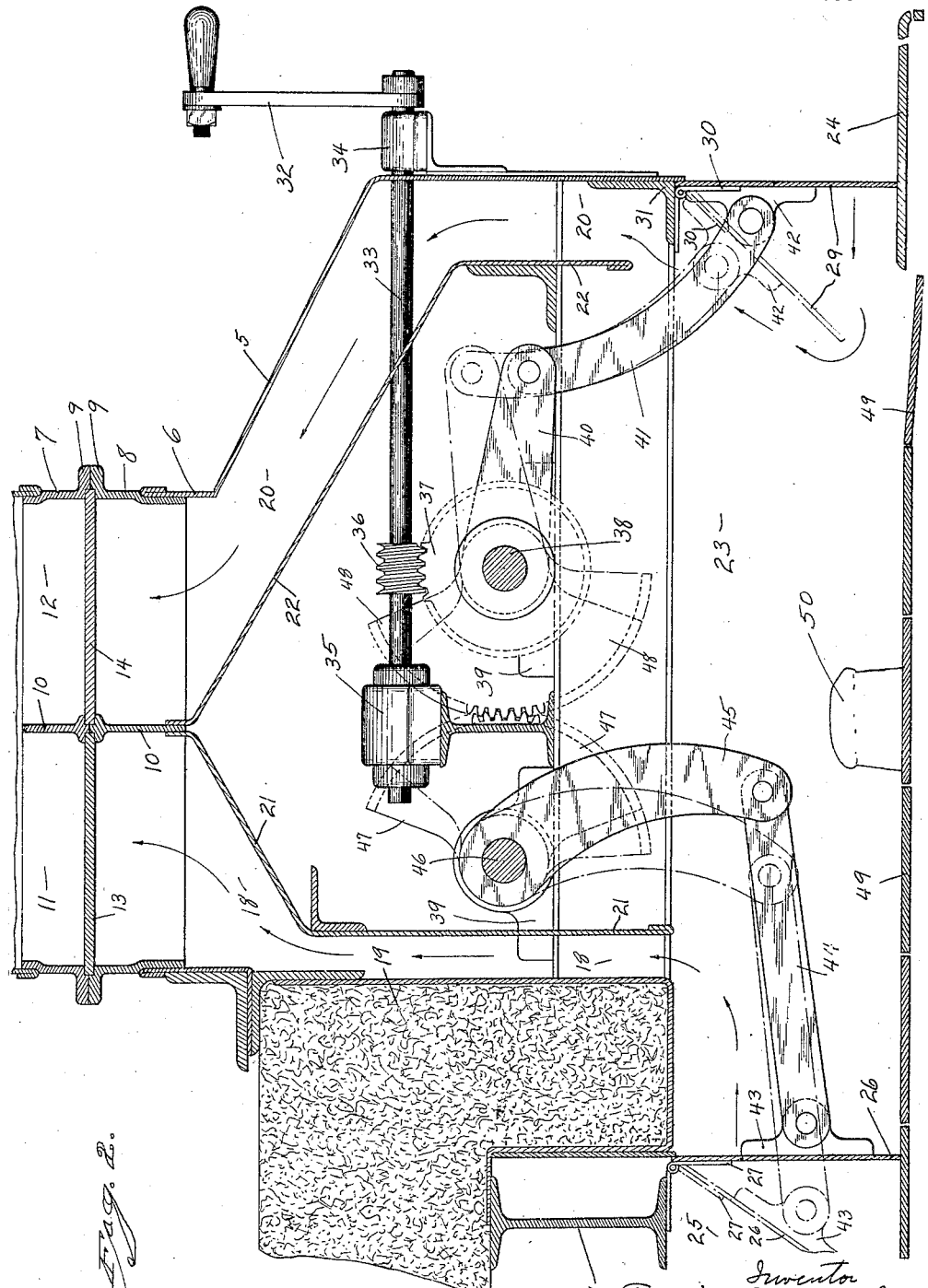

Patented Nov. 15, 1927.

1,649,576

UNITED STATES PATENT OFFICE.

EMERICK B. CRAWFORD, OF NEW HAVEN, CONNECTICUT, ASSIGNOR TO THE OVEN EQUIPMENT & MANUFACTURING COMPANY, OF NEW HAVEN, CONNECTICUT, A CORPORATION.

VENTILATING HOOD FOR OVEN STRUCTURES.

Application filed January 19, 1927. Serial No. 162,069.

My invention relates to an improvement in ventilating-hoods for oven-structures designed for baking food-stuffs, japanned and painted articles, foundry cores, etc., on a large scale, the object of my present invention being to protect the workmen employed in charging the oven against the heat and fumes which seek to escape when the oven is opened for charging it, to prevent their escape into the room in which the workmen are engaged, and also to effect an economy of time and fuel in the baking operations, which are retarded by the escape, as described, of heat and fumes from the oven during the charging of the same.

With these ends in view, my invention consists in a ventilating-hood for oven-structures of the class described, the said hood being characterized by its provision with a hot inner and a cold outer duct, respectively located adjacent to the oven and to the loading-opening thereof, whereby the outer air having access to the cold outer duct acts as a baffle to prevent the heated products issuing from the oven from escaping into the room in which the workmen are employed in loading the oven-conveyor and tends to confine their escape through the hot duct provided for that purpose.

My invention further consists in a ventilating-hood for oven-structures characterized as above and having certain other details as will be hereinafter described and pointed out in the claims.

In the accompanying drawings:

Fig. 1 is a broken view in end elevation of a baking-oven provided with a duplex ventilating-hood constructed in accordance with my invention;

Fig. 2 is a view thereof in vertical transverse section on the line 2—2 of Fig. 1 on a larger scale; and Fig. 3 is a detail plan view of the lower gate-casting of the hood with the two gates in place therein.

In carrying out my invention, as herein shown, the hood 5, preferably made of sheet-metal, is provided at its upper end with a rectangular neck 6 receiving a two-part rectangular gate-casting, of which the upper and lower parts 7 and 8 are formed with flanges 9 by which they are bolted together. The central partition 10, forming a part of the said gate-castings 7 and 8, divides the rectangular chamber enclosed thereby into two corresponding rectangular passages 11 and 12 regulated by horizontally-arranged valve-gates 13 and 14, the edges of which slide in grooves formed in the gate-castings. The said valve-gates 13 and 14 are provided with operating-rods 15 terminating at their outer ends in handles 16, by which the said valve-gates are moved independently of each other, so as to control the effective sizes of the said passages 11 and 12, the said valves being supported when moved outwardly by horizontally-projecting webbed flanges 17 forming extensions of the flanges 9 of the respective castings 7 and 8.

The passage 11 aforesaid communicates with the upper end of a vertical inner hot duct 18, which lies along the front wall 19 of the oven-structure, while the passage 12 communicates with the upper end of an outer cold duct 20, the lower end of which lies along the front wall of the hood 5. The said passages 18 and 20 are formed in part by inner partitions 21 and 22 located within the hood and attached at their upper ends to the lower edge of the central partition 10 before mentioned.

Under the construction described, the inner hot duct 18 and the outer cold duct 20 are, at their lower ends, separated from each other by substantially the depth of the hood from front to rear, the lower or intake end of the inner duct 18 lying adjacent to the oven-structure and the lower or intake end of the outer duct 20 lying adjacent to the front wall of the hood and hence to the open air.

The lower ends of the said ducts 18 and 20 virtually open into a horizontally-arranged passage 23 included within the hood. For convenience, I shall call this passage 23 the vestibule, since it extends between the loading-table 24 (mainly located outside of my improved ventilating-hood) and the baking-chamber 25 of the oven-structure.

Between the rear end of the vestibule 23 and the baking-chamber 25, I locate, as shown, an oven-door 26 suspended by hinges 27 from an I-beam 28 forming a part of the oven-structure, while, at the outer end of the vestibule 23, I locate a vestibule-door 29 suspended by hinges 30 from an angle-iron 31 forming a part of the ventilating-hood.

For the concurrent operation of these two doors 26 and 29, I employ a crank-handle 32 located in front of the hood at a point over the loading-table 24 and mounted upon the projecting forward end of a horizontal shaft 33 journaled in bearings 34 and 35 and mounting a worm 36 meshing into a worm-wheel 37 on a horizontal shaft 38 extending at a right angle to the shaft 33 aforesaid and journaled at its ends in bearings 39 on the opposite sides of the hood. Near its opposite ends, the shaft 38 is provided with arms 40 connected by bowed links 41 with brackets 42 upon the inner face of the vestibule-door 29, whereby the same is opened and closed by turning the crank-arm 32. For simultaneously opening and closing the oven-door 26, the same is provided near the ends of its outer face with brackets 43 connected by links 44 with the lower ends of bowed lever-arms 45 mounted near the ends of a horizontal rock-shaft 46 carrying, at its opposite ends, corresponding gear-segments 47 meshed into by corresponding gear-segments 48 mounted upon the ends of the shaft 38 before mentioned.

The oven-structure, whatever its specific character and construction, is provided with a traveling-conveyor of some description, such as a conveyor composed of a series of plates 49 which, in effect, form the baking-hearth of the oven as the conveyor moves through the same. A loaf of bread 50 is shown as resting on one of these conveyor-plates.

When a baking-oven of the character being described is being loaded or charged, its highly-heated gaseous content tends to flow or billow outward upon the person engaged in loading its conveyor, rendering his position almost unbearable and slowing down his work, as well as polluting the atmosphere of the room in which he is working. Under my invention, this tendency of the hot products of the oven to stream out, as described, is overcome in large part by the widely-separated hot inner and cold outer ducts or vents provided by my improved ventilating-hood, in which a hot duct or vent is located adjacent the oven and a cold vent adjacent the loading-opening in the hood. While the action of these two inner and outer ventilating ducts or vents located as described may be accounted for in different ways, I incline to the opinion that the outer air passing inward through the loading-opening into the vestibule and upward through the outer air-duct, virtually blankets, in large part, the hot products of combustion seeking to escape from the baking-chamber through the vestibule into the outer air and forcing them back to make their escape through the hot inner duct provided for the purpose. Whatever may be the true explanation of the behaviour of my improvement, and it is apparent that numerous factors enter into this, I have found the operation of my improved ventilating-hood to be very highly successful in preventing the escape of the hot gaseous content of the baking-oven during the loading thereof. While I have shown and described the use of an oven-door and a loading door, such doors may, in some instances, be omitted, together with the means for operating them. I have found that the best results are obtained when the cross-sectional area of the rectangular passage 11 is greater than the effective cross-sectional area of the inner hot duct 18, and similarly when the cross-sectional area of the rectangular passage 12 exceeds the effective cross-sectional area of the outer cold duct 20.

I claim:

1. A ventilating-hood for baking-ovens, provided with a vertibule having a charging-opening at one end and an oven-opening at its other end, and hot and cold air-ducts leading upward from the ends of the said vestibule and substantially separated from each other by the length thereof, whereby the major portion of the hot products issuing from the oven-opening are baffled and caused to escape through the said hot duct by the air flowing through the said charging-opening and ultimately escaping through the said cold duct.

2. A ventilating-hood for baking-ovens, provided with a vestibule having at one end an oven-opening leading into the baking-chamber of the oven and having a charging-opening at its opposite end, hot and cold air-ducts with intake-openings respectively located substantially at the ends of the said vestibule, doors for the said openings, and means for concurrently opening and closing the said doors.

3. A ventilating-hood for baking-ovens, provided with a vestibule having at one end an oven-opening leading into the baking-chamber of the oven and having a charging-opening at its opposite end, hot and cold air-ducts with intake-openings respectively located substantially at the ends of the said vestibule, doors for the said openings, and means located between the said ducts for concurrently opening and closing the said doors.

4. A ventilating-hood for baking-ovens, provided with a vestibule having at one end an oven-opening leading into the baking-chamber of the oven and having a charging-opening at its opposite end, hot and cold air-ducts with intake-openings respectively located substantially at the ends of the said vestibule, doors for the said openings, means for opening and closing the said doors, and a traveling-conveyor arranged to make the transit of the said vestibule.

5. A ventilating-hood for baking-ovens, provided with a vestibule having a charging-opening at one end and an oven-opening at its opposite end, and having hot and cold ducts leading upward from its ends and substantially separated from each other by its length, whereby the major portion of the hot products issuing from the oven are baffled and caused to escape through the hot duct by the air flowing through the charging-opening and ultimately escaping through the cold duct, and independently operable valve-gates for opening and closing the said ducts.

6. The combination with a baking-oven structure, of a ventilating-hood provided with a vestibule opening at its rear end into the baking-chamber of the oven-structure and terminating at its forward end in a charging opening, a hot air duct having its inlet-opening located at the rear end of the said vestibule and extending up along the front of the oven-structure, a cold air duct having its inlet-opening located at the forward end of the said vestibule and extending upward along the front of the said hood, valve-gates for independently controlling the said ducts, doors for the oven-opening and for the loading-opening, and means located between the said ducts for concurrently operating the said doors.

In testimony whereof, I have signed this specification.

EMERICK B. CRAWFORD.